United States Patent Office 2,992,245
Patented July 11, 1961

2,992,245
2α-METHYL-9α-BROMO-17α-HYDROXY-4-PREG-NENE-3,11,20-TRIONE 17-ACYLATES
John A. Hogg, Charleston Township, Kalamazoo County, Frank H. Lincoln, Kalamazoo, and William P. Schneider, Kalamazoo Township, Kalamazoo County, Mich., assignors to The Upjohn Company, Kalamazoo, Mich., a corporation of Delaware
No Drawing. Filed Dec. 14, 1959, Ser. No. 859,098
2 Claims. (Cl. 260—397.45)

This invention relates to novel steroid esters and more particularly to 2α-methyl-9α-bromo-17α-hydroxy-4-pregnene-3,11,20-trione 17-acylates and to a process for the production thereof.

The novel 2α-methyl-9α-bromo-17α-hydroxy-4-pregnene-3,11,20-trione 17-acylates of this invention are highly active oral progestational agents and are moreover useful in the inhibition of ovulation. An advantage of the compounds of this invention is their low mineralocorticoid activity.

The novel compounds of this invention can be prepared and administered to birds and mammals (including humans) in a variety of oral dosage forms singly, or in admixture with other coacting compounds. They can be associated with a pharmaceutical carrier which can be a solid material or a liquid in which the compound is dissolved, dispersed or suspended. The solid compositions can be tablets, powders, capsules, pills, preferably in unit dosage forms for simple administration or precise dosages. The liquid compositions can be solutions, emulsions, suspensions, syrups or elixirs.

Tablets for oral use (10,000) each containing 2.5 mg. of steroid are prepared from the following types and amounts of material:

| | Grams |
|---|---|
| 2α-methyl-9α-bromo-17α-hydroxy-4-pregnene-3,11,20-trione 17-acetate | 25 |
| Lactose USP | 2,250 |

The finely powdered steroid and lactose are mixed well and granulated with syrup-starch paste. Starch and calcium stearate are used as lubricants in the compressing step.

The oral administration of 1 tablet daily is useful in the treatment of secondary amenorrhea in humans.

The process of this invention comprises dehydration of 2α-methyl-11β,17α-dihydroxy-4-pregnene-3,20-dione to obtain 2α-methyl-17α-hydroxy-4,9(11)-pregnadiene-3,20-dione; acylating the latter compound with an acylating agent to obtain the corresponding 2α-methyl-17α-hydroxy-4,9(11)-pregnadiene-3,20-dione 17-acylate; treating the 17-acylate thus produced with a source of hypobromous acid to obtain the corresponding 2α-methyl-9α-bromo-11β,17α-dihydroxy-4-pregnene-3,20-dione 17-acylate and oxidizing the latter compound to obtain the corresponding 2α-methyl-9α-bromo-17α-hydroxy-4-pregnene-3,11,20-trione 17-acylate.

The novel compounds of this invention and the process for their preparation are illustratively represented by the following reaction scheme:

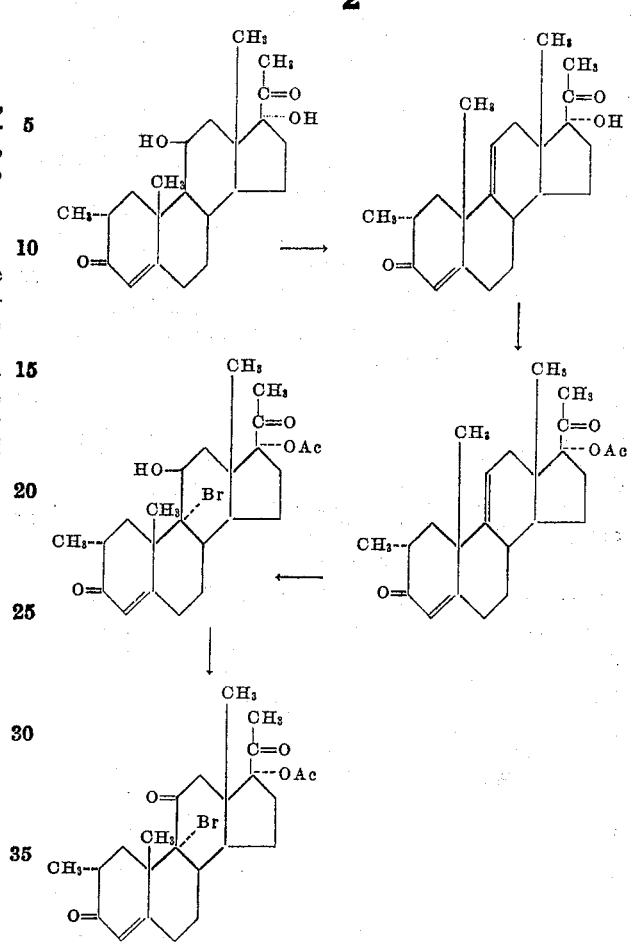

wherein Ac is the acyl radical of an organic carboxylic acid, preferably a hydrocarbon carboxylic acid containing from 1 to 12 carbon atoms, inclusive.

The starting material for this invention is prepared in accordance with the preparations and examples of U.S. Patent 2,865,935, particularly Example 5, to give 2α-methyl-11β,17α-dihydroxy-4-pregnene-3,20-dione.

In carrying out the process of this invention, 2α-methyl-11β,17α-dihydroxy-4-pregnene-3,20-dione is dehydrated to 2α-methyl-17α-hydroxy-4,9(11)-pregnadiene-3,20-dione by methods known in the art, e.g., by a dehydrating agent such as phosphorous oxychloride, thionyl chloride, hydrochloric acid or sulfuric acid and acetic acid or by pyrolysis as shown in U.S. Patents 2,640,838 and 2,640,839, or the dehydration can be effected by the preferred method of reacting 2α-methyl-11β,17α-dihydroxy-4-pregnene-3,20-dione with a carboxylic acid N-haloamide or N-haloimide, according to the procedure of U.S. Patent 2,838,498, e.g., N-bromoacetamide in pyridine followed by anhydrous sulfur dioxide.

The 2α-methyl-17α-hydroxy-4,9(11)-pregnadiene-3,20-dione thus produced, is then acylated at the 17-position to produce the corresponding 2α-methyl-17α-hydroxy-4,9-

(11)-pregnadiene-3,20-dione 17-acylate according to procedures well known in the art for esterifying tertiary hydroxy groups, e.g., Babcock et al., J. Am. Chem. Soc. 80, 2904 (1958), Huang-Minlon et al., J. Am. Chem. Soc. 74, 5394 (1952) and by refluxing in acetic anhydride in the presence of calcium carbonate. Preferably the esterification is accomplished using the acid anhydride of an aliphatic acid, e.g., acetic, propionic, butyric, valeric, hexanoic, lauric, trimethylacetic, isobutyric, isovaleric, tertiary butylacetic or formic acid (in the presence of acetic anhydride), a cycloaliphatic acid, e.g., $\beta$-cyclopentylpropionic, cyclohexane-carboxylic, cyclohexylacetic, an alkaryl acid, e.g., benzoic, phenylacetic, $\beta$-phenylacetic, $\beta$-phenylpropionic, o-, m-, p-toluic, a saturated dibasic acid (which can be converted into water soluble, e.g., sodium salts), e.g., succinic, adipic, a monobasic unsaturated acid, e.g., acrylic, crotonic, undecylenic, propiolic, 2-butynoic, undecolic, cinnamic, dibasic unsaturated acids (which can be converted into water soluble, e.g., sodium salts), e.g., maleic and citraconic, and the like in the presence of an acid catalyst, e.g., p-toluenesulfonic acid.

The selected 2$\alpha$-methyl-17$\alpha$-hydroxy-4,9(11)-pregnadiene-3,20-dione 17-acylate thus obtained is converted to the corresponding 2$\alpha$-methyl - 9$\alpha$ - bromo-11$\beta$,17$\alpha$-dihydroxy - 4 - pregnene-3,20-dione 17 - acylate by methods known in the art, e.g., using N-bromoacetamide in the presence of perchloric acid according to the procedure of U.S. Patent 2,852,511.

The selected 2$\alpha$-methyl-9$\alpha$-bromo-11$\beta$,17$\alpha$-dihydroxy-4-pregnene-3,20-dione 17-acylate thus obtained is then oxidized by known methods, e.g., chromic acid in acetic acid, to give the respective 2$\alpha$-methyl-9$\alpha$-bromo-17$\alpha$-hydroxy-4-pregnene-3,11,20-trione 17-acylate.

The following examples are illustrative of the process and products of this invention.

EXAMPLE 1

*2$\alpha$-methyl-17$\alpha$-hydroxy-4,9(11)-pregnadiene-3,20-dione*

A solution containing 3.60 g. of 2$\alpha$-methyl-11$\beta$,17$\alpha$-dihydroxy-4-pregnene-3,20-dione in 30 ml. of pyridine at 25° C. was treated with 2.21 g. of N-bromoacetamide. After 20 minutes the solution was cooled and an excess of anhydrous sulfur dioxide was added with stirring. The reaction mixture was kept at about 25° C. for a period of 30 minutes and then cooled. 100 ml. of water was then added with stirring to the cooled reaction mixture and the cooling was continued for several hours keeping the temperature at 5° C. The precipitate thus obtained was collected on a filter, washed with water and dried under vacuum at 70° C. to give 2.9 g. of 2$\alpha$-methyl-17$\alpha$-hydroxy-4,9(11)-pregnadiene-3,20-dione. The crude product thus obtained was dissolved in a mixture of 50 ml. of methylene chloride and 25 ml. of Skellysolve B hexanes and chromatographed on a column containing 150 g. of Florisil synthetic magnesium silicate. The column was eluted with 160 ml. fractions of 8% acetone in Skellysolve B hexanes. Fractions 3–13 were combined to give 1.52 g. of product, which on recrystallization from acetone: Skellysolve B hexanes gave 0.93 g. of 2$\alpha$-methyl-17$\alpha$-hydroxy-4,9(11)-pregnadiene-3,20-dione melting at 229–231° C., $[\alpha]_D^{26}$ +92 (chloroform).

*Analysis.*—Calcd. for $C_{22}H_{30}O_3$: C, 77.15; H, 8.83. Found: C, 77.85; H, 8.79.

EXAMPLE 2

*2$\alpha$-methyl-17$\alpha$-hydroxy-4,9(11)-pregnadiene-3,20-dione 17-acetate*

A mixture was prepared containing 1.0 g. of 2$\alpha$-methyl-17$\alpha$-hydroxy-4,9(11)-pregnadiene-3,20-dione, 20 ml. of acetic acid, 5 ml. of acetic anhydride and 0.4 g. of p-toluenesulfonic acid monohydrate. The mixture was stirred until a clear solution was obtained. The reaction mixture was allowed to stand for several hours and was then poured into 96 ml. of water. The aqueous mixture was chilled at 5° C. until a precipitate was obtained. The precipitate was collected on a filter and washed with cold water. The precipitate was then dissolved in 15 ml. of methylene chloride, washed with water, dried over sodium sulfate, and concentrated to about 5 ml. Methanol (10 ml.) was then added and the solution was concentrated to 9 ml. The concentrated solution was then treated with 0.15 ml. of 10% aqueous sodium hydroxide solution. After cooling, the formed crystals were collected on a filter to give 0.71 g. of 2$\alpha$-methyl-17$\alpha$-hydroxy-4,9(11)-pregnadiene-3,20-dione 17-acetate melting at 241–243°C. Recrystallization from methanol gave 0.65 g. of 2$\alpha$-methyl-17$\alpha$-hydroxy-4,9(11)-pregnadiene - 3,20-dione 17-acetate melting at 241–243° C., $[\alpha]_D^{26}$ +75° (chloroform);

$\nu_{max}^{mineral\ oil}$ 1727, 1675, 1640, and 1618 cm.$^{-1}$

In the same manner substituting the anhydride of another hydrocarbon carboxylic acid, e.g., those acids previously listed, for acetic anhydride in the procedure of Example 2 is productive of the corresponding 2$\alpha$-methyl-17$\alpha$-hydroxy-4,9(11)-pregnadiene-3,20-dione 17-acylate, e.g., 2$\alpha$-methyl-17$\alpha$-hydroxy-4,9(11)-pregnadiene - 3,20-dione 17-propionate, 2$\alpha$-methyl-17$\alpha$-hydroxy-4,9(11)-pregnadiene - 3,20-dione 17-butyrate, 2$\alpha$-methyl-17$\alpha$-hydroxy-4,9(11)-pregnadiene - 3,20-dione 17-caproate, 2$\alpha$-methyl-17$\alpha$-hydroxy-4,9(11)-pregnadiene - 3,20-dione 17-($\beta$-cyclopentylpropionate), 2$\alpha$-methyl-17$\alpha$-hydroxy-4,9(11)-pregnadiene - 3,20-dione 17-phenylacetate and the like.

EXAMPLE 3

*2$\alpha$-methyl-9$\alpha$-bromo-11$\beta$,17$\alpha$-dihydroxy-4-pregnene-3,20-dione 17-acetate*

To a solution of 4.40 g. of 2$\alpha$-methyl-17$\alpha$-hydroxy-4,9(11)-pregnadiene-3,20-dione 17-acetate in 250 ml. of t-butyl alcohol and 50 ml. of methylene chloride was added a solution of 12.5 ml. of 70% perchloric acid in 87 ml. of water followed by a solution of 1.88 g. of N-bromoacetamide in 50 ml. of t-butyl alcohol. After stirring the reaction mixture for a period of about 15 minutes, a solution of 2.5 g. of sodium sulfite in 40 ml. of water was added and the reaction mixture was carefully concentrated to about 440 ml. under reduced pressure with no external heat. The concentrate was stirred and 500 ml. of water was added to give 5.80 g. of 2$\alpha$-methyl-9$\alpha$-bromo - 11$\beta$,17$\alpha$-dihydroxy-4-pregnene - 3,20-dione 17-acetate as a yellow crystalline solid melting at 168–170° C. An analytical sample was prepared by recrystallizing 0.5 g. of the yellow crystalline solid from a mixture of methylene chloride and Skellysolve B hexanes to give 0.4 g. of 2$\alpha$-methyl-9$\alpha$-bromo-11$\beta$,17$\alpha$-dihydroxy-4-pregnene-3,20-dione 17-acetate melting at 170–172° C. with decomposition.

*Analysis.*—Calcd. for $C_{24}H_{33}BrO_5$: Br, 16.60. Found: Br, 16.60.

In the same manner substituting another 2$\alpha$-methyl-17$\alpha$-hydroxy-4,9(11)-pregnadiene-3,20-dione 17-acylate wherein the acyl radical is that of an acid previously listed, for 2$\alpha$-methyl-17$\alpha$-hydroxy-4,9(11)-pregnadiene-3,20-dione 17-acetate in the procedure of Example 3 is productive of the corresponding 2$\alpha$-methyl-9$\alpha$-bromo-11$\beta$,17$\alpha$-dihydroxy-4-pregnene-3,20-dione 17-acetate, e.g., 2$\alpha$-methyl-9$\alpha$-bromo-11$\beta$, 17$\alpha$-dihydroxy-4-pregnene-3,20-dione 17-propionate, 2$\alpha$-methyl-9$\alpha$-bromo-11$\beta$, 17$\alpha$-dihydroxy-4-pregnene-3,20-dione 17-butyrate, 2$\alpha$-methyl-9$\alpha$-bromo-11$\beta$, 17$\alpha$-dihydroxy-4-pregnene-3,20-dione 17-caproate, 2$\alpha$-methyl-9$\alpha$-bromo-11$\beta$, 17$\alpha$-dihydroxy-4-pregnene-3,20-dione 17-($\beta$-cyclopentylpropionate), 2α-methyl-9α-bromo-11β, 17α-dihydroxy-4-pregnene-3,20-dione 17-phenylacetate and the like.

EXAMPLE 4

*2α-methyl-9α-bromo-17α-hydroxy-4-pregnene-3,11,20-trione 17-acetate*

To a stirred mixture of 4.2 g. of 2α-methyl-9α-bromo-11β,17α-dihydroxy-4-pregnene-3,20-dione 17-acetate in 100 ml. of acetic acid was added a solution of 4.2 g. of sodium dichromate in 25 ml. of acetic acid. After about 17 hours the reaction mixture was cooled to 15° C. and 400 ml. of water was added to precipitate the product. The precipitate was collected on a filter, washed with water and dried to give 3.01 g. of 2α-methyl-9α-bromo-17α-hydroxy-4-pregnene-3,11,20-trione 17-acetate melting at 167–170° C. with decomposition. A 2.6 g. portion of the product thus obtained was dissolved in 50 ml. of methylene chloride and 50 ml. of Skellysolve B hexanes and poured onto a chromatographic column containing 125 g. of Florisil synthetic magnesium silicate. The product was eluted with 4.5 liters of acetone: Skellysolve B hexanes 7:93 taking 150 ml. fractions. After evaporating the solvent, fractions 12–27, weighing 2.36 g., were combined and crystallized from methylene chloride-Skellysolve B hexanes to give 2.03 g. of 2α-methyl-9α - bromo - 17α - hydroxy - 4 - pregnene - 3,11,20 - trione 17-acetate melting at 167–170° C. with decomposition, $[\alpha]_D$ +197° (chloroform).

*Analysis.*—Calcd. for $C_{24}H_{31}BrO_5$: C, 60.12; H, 6.52; Br, 16.67. Found: C, 60.32; H, 6.81; Br, 17.00.

In the same manner substituting another 2α-methyl-9α-bromo - 11β,17α - dihydroxy - 4 - pregnene - 3,20 - dione 17-acylate, wherein the acyl radical is that of an acid previously listed, for 2α-methyl-9α-bromo-11β,17α-dihydroxy-4-pregnene-3,20-dione 17-acetate in the procedure of Example 4 is productive of the corresponding 2α-methyl-9α - bromo - 17α - hydroxy - 4 - pregnene - 3,11,20-trione 17-acylate, e.g., 2α-methyl-9α-bromo-17α-hydroxy-4-pregnene-3,11,20-trione 17-propionate, 2α-methyl-9α-bromo - 17α - hydroxy - 4 - pregnene - 3,11,20 - trione 17-butyrate, 2α - methyl - 9α - bromo - 17α - hydroxy - 4-pregnene - 3,11,20 - trione 17 - caproate, 2α - methyl-9α - bromo - 17α - hydroxy - 4 - pregnene - 3,11,20 - trione 17 - (β - cyclopentylpropionate), 2α - methyl - 9α-bromo - 17α - hydroxy - 4 - pregnene 3,11,20 - trione 17-phenylacetate and the like.

We claim:

1. 2α - methyl - 9α - bromo - 17α - hydroxy - 4 - pregnene-3,11,20-trione 17-acylate, wherein the acyl radical is that of a hydrocarbon carboxylic acid containing from 1 to 12 carbon atoms, inclusive.

2. 2α - methyl - 9α - bromo - 17α - hydroxy - 4 - pregnene-3,11,20-trione 17-acetate.

References Cited in the file of this patent

UNITED STATES PATENTS

| | | |
|---|---|---|
| 2,835,680 | Fried | May 20, 1958 |
| 2,838,498 | Magerlein et al. | June 10, 1958 |
| 2,852,511 | Fried | Sept. 16, 1958 |
| 2,865,935 | Schneider et al. | Dec. 23, 1958 |
| 2,892,851 | Bergstrom et al. | June 30, 1959 |

OTHER REFERENCES

Bergstrom et al.: J.A.C.S., volume 81, pp. 4432–33 (August 1959).

UNITED STATES PATENT OFFICE
CERTIFICATE OF CORRECTION

Patent No. 2,992,245                                          July 11, 1961

John A. Hogg et al.

It is hereby certified that error appears in the above numbered patent requiring correction and that the said Letters Patent should read as corrected below.

Column 4, line 14, for "241-243° C." read -- 241-244° C. -- line 66, for "17-acetate" read -- 17-acylate --.

Signed and sealed this 28th day of November 1961.

(SEAL)
Attest:

ERNEST W. SWIDER
Attesting Officer

DAVID L. LADD
Commissioner of Patents